No. 715,652. Patented Dec. 9, 1902.
F. G. FRANKENBERG.
TOBACCO STRIPPING MACHINE.
(Application filed May 24, 1902.)
(No Model.) 12 Sheets—Sheet 3.

Witnesses
G. A. Rauberschmidt
C. E. Stern

Inventor
Frederick G. Frankenberg
By Casper L. Redfield
Atty

No. 715,652. Patented Dec. 9, 1902.
F. G. FRANKENBERG.
TOBACCO STRIPPING MACHINE.
(Application filed May 24, 1902.)
(No Model.) 12 Sheets—Sheet 9.

No. 715,652. Patented Dec. 9, 1902.
F. G. FRANKENBERG.
TOBACCO STRIPPING MACHINE.
(Application filed May 24, 1902.)
(No Model.) 12 Sheets—Sheet 10.

Witnesses:

Inventor:
Frederick G. Frankenberg
By Casper L. Redfield Atty.

No. 715,652. Patented Dec. 9, 1902.
F. G. FRANKENBERG.
TOBACCO STRIPPING MACHINE.
(Application filed May 24, 1902.)

(No Model.) 12 Sheets—Sheet 12.

Witnesses
G A Nauberschmidt
C E Steere

Inventor
Frederick G. Frankenberg
By Casper L. Redfield
Atty

UNITED STATES PATENT OFFICE.

FREDERICK G. FRANKENBERG, OF CHICAGO, ILLINOIS, ASSIGNOR TO LANDON-SHARP MACHINE COMPANY, OF CHICAGO, ILLINOIS.

TOBACCO-STRIPPING MACHINE.

SPECIFICATION forming part of Letters Patent No. 715,652, dated December 9, 1902.

Application filed May 24, 1902. Serial No. 108,756. (No model.)

*To all whom it may concern:*

Be it known that I, FREDERICK G. FRANKENBERG, a citizen of the United States of America, and a resident of Chicago, county of Cook, and State of Illinois, have invented certain new and useful Improvements in Tobacco-Stripping Machines, of which the following is a specification.

My invention relates to tobacco-stripping machines, and has for its object improvements in the construction and operation of such machines.

In machines of the class to which the present invention relates the stem of the tobacco-leaf is inserted between knives, which open and close, and after the knives are closed the stem is seized by fingers and drawn through the knives, leaving the leaf on one side of the knives and discharging the stem on the other. The knives and gripping-fingers operate continuously, and to facilitate the presentation of the stem of the leaf at the proper time certain automatic feeding and indicating devices are added.

My invention is illustrated in the accompanying drawings, in which—

Fig. 3 is a side elevation. Fig. 8 is a section on line 8 8 of Fig. 7.

In the said drawings, A and A' are side frames connected together by tie-bolts $A^2$. Supported in the side frames is a drive-shaft B, to which power is conveyed by a pulley B'. From a gear $B^2$ on the shaft B power is conveyed through an idle gear $B^3$ to a gear C' on the shaft C, which is provided with cranks $C^2$ and $C^3$.

Across the top of the machine is a bridge $A^3$, provided with two pairs of lugs $A^4$. In each pair of lugs is pivoted a lever D, within which is a slot D'. Secured to each lever by bolts running through the slots D' are blocks $D^2$, provided with pins $D^3$. From the pins $D^3$ pitmen $C^4$ connect to the cranks $C^2$ and $C^3$. When the cranks revolve, being on opposite sides of the shaft C, they vibrate the levers D alternately back and forth. The slots D' permit of adjusting the positions of the blocks $D^2$, and consequently the pins $D^3$, the result of which is a corresponding variation in the amplitude of the vibrations of the levers D. In the lower end of each lever is a second slot $D^4$, in which is a sliding block made up of the parts $D^5$ and $D^6$. These parts are secured together by bolts $D^7$. At the extreme lower end of each lever D is a bolt $D^8$, to which are pivoted the gripping-fingers E, which are made up of right-angled levers which cross each other and are connected together after the manner of the jaws of ordinary pliers. At the outer ends E' of the fingers E are connected the links $E^2$, the other ends of which links are connected to the lower pins $D^7$ in the blocks $D^5$. The construction of these parts is such that when the blocks $D^5$ rise in the slots $D^4$ the fingers E are closed together, so as to grip anything that may be between them. When the blocks $D^5$ move downward in the slots $D^4$, the connected fingers E are opened to release anything previously gripped. Partly in a hole $D^9$ in the block $D^5$ and partly in a corresponding hole in the lever D at the upper end of the slot $D^4$ is a spring $D^{10}$, the action of which is to press the block $D^5$ downward and cause the fingers E to open when the said block is not held up, as will be hereinafter described. On the inner face of each jaw of the fingers E is secured a small piece of leather or other yielding material $E^3$, which serves as a buffer when the said fingers are closed. Secured in one finger E is a pin $E^4$, which fits into a corresponding hole $E^5$ in its mate. The object of this pin is to hold the fingers more securely in line with each other when under strain.

Secured to the upper bolt $D^7$ of each lever D are the rods F, which connect, by means of the springs $F^2$, with the front end of a forked lever G. In each rod F is a turnbuckle F', by means of which the said rods are lengthened and shortened, with consequent adjustment of the springs $F^2$.

The levers G are pivoted on a rod G', which is supported in the frames A and A'. On the rear end of each lever G is a roller $G^2$, which is engaged by a cam H on the shaft H'. On the rear part of the bridge $A^3$ are the brackets $A^5$, by which is supported the rod $A^6$. This rod is vertically adjusted by means of the set-screws $A^8$ and the blocks $A^7$, which are guided in the brackets $A^5$. Between the rod $A^6$ and the levers G are the springs $G^3$, which act to hold the rollers $G^2$ against the cams H. The cams H are made up of circles and abrupt inclines, so that the levers G will be held for a considerable length of time at either of two positions and will be moved quickly from one position to the other. This movement of a lever G is conveyed through the connecting-springs $F^2$ and the rods F to the block $D^5$ and from this block through the links $E^2$ to the fingers E to open and close them. When a cam H raises the rear end of a lever G, the tension on the springs $F^2$ is relaxed, when the spring $D^{10}$ pushes the block $D^5$ downward, and consequently opens the fingers E. When the roller $G^2$ passes off of the high part of the cam H, the spring $G^3$ raises the forked end of the lever G, thus applying tension to the springs $F^2$ and compressing the spring $D^{10}$ by raising the block $D^5$. The result of this is a closing of the fingers E. It will be observed that the closing action is through the springs $F^2$, which gives a yielding pressure on the stems of the leaves seized by said fingers and that the amount of this pressure is adjustable by means of the turnbuckle F'.

Figure 7:
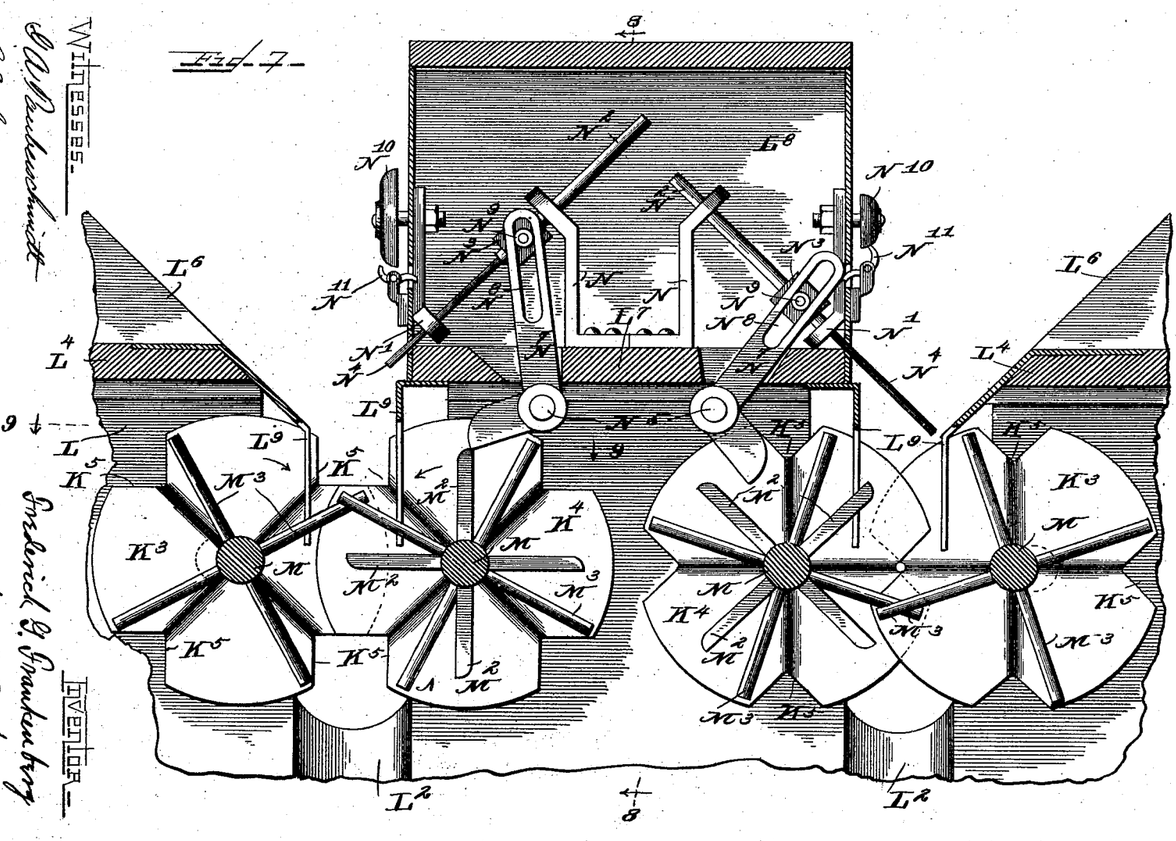
Fig. 7 is an enlarged elevation, partly in section on line 7 7 of Fig. 8, showing the knives and their associated devices.
Figure 9:
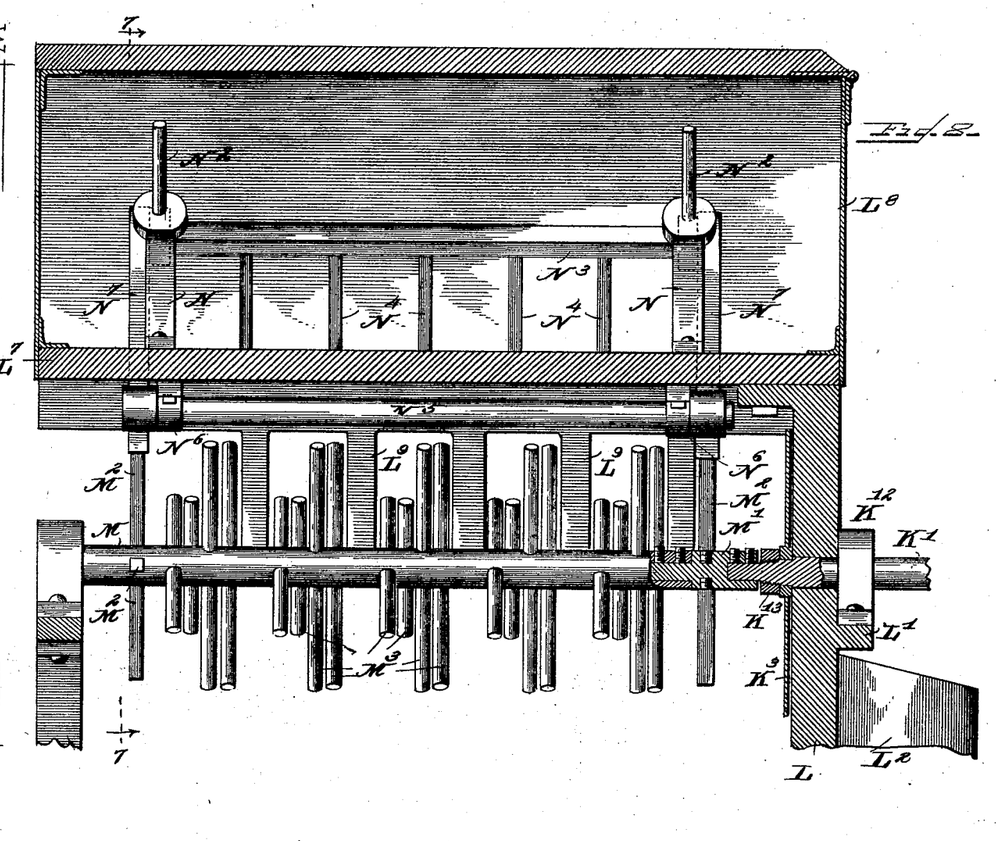
Fig. 9 is a section on line 9 9 of Fig. 7 and illustrates, at an enlarged scale, some of the devices shown in Fig. 4.
Figure 10:
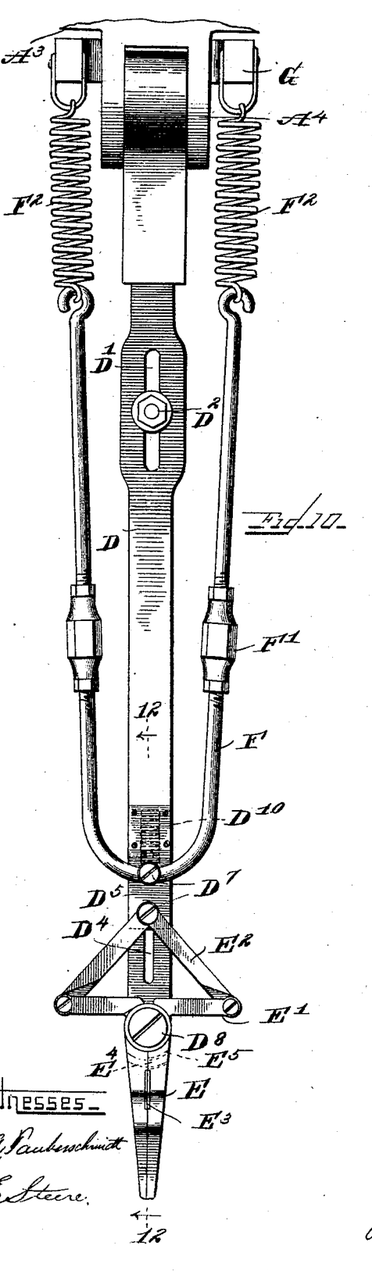
Figs. 10 and 11 are enlarged elevations in two positions of the stem-gripping fingers and their connections.
Figure 11:
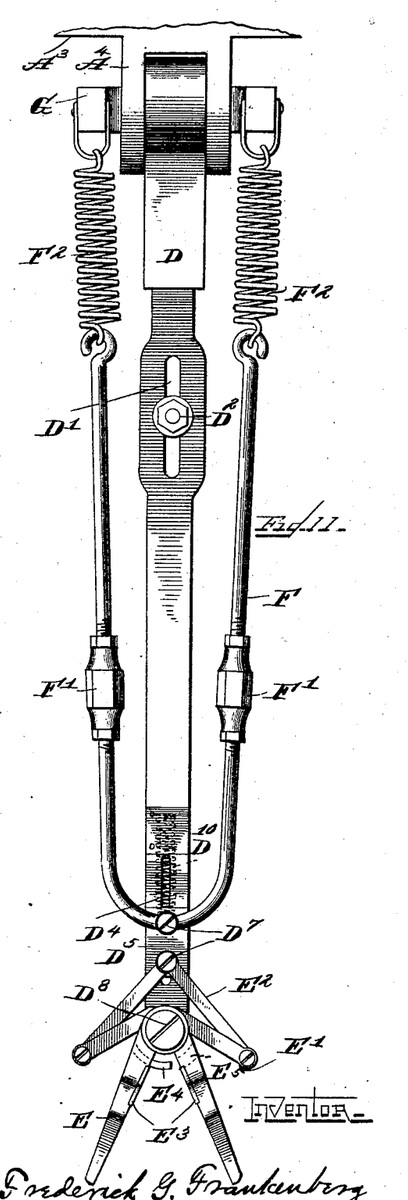
Figures 12, 13, 14:
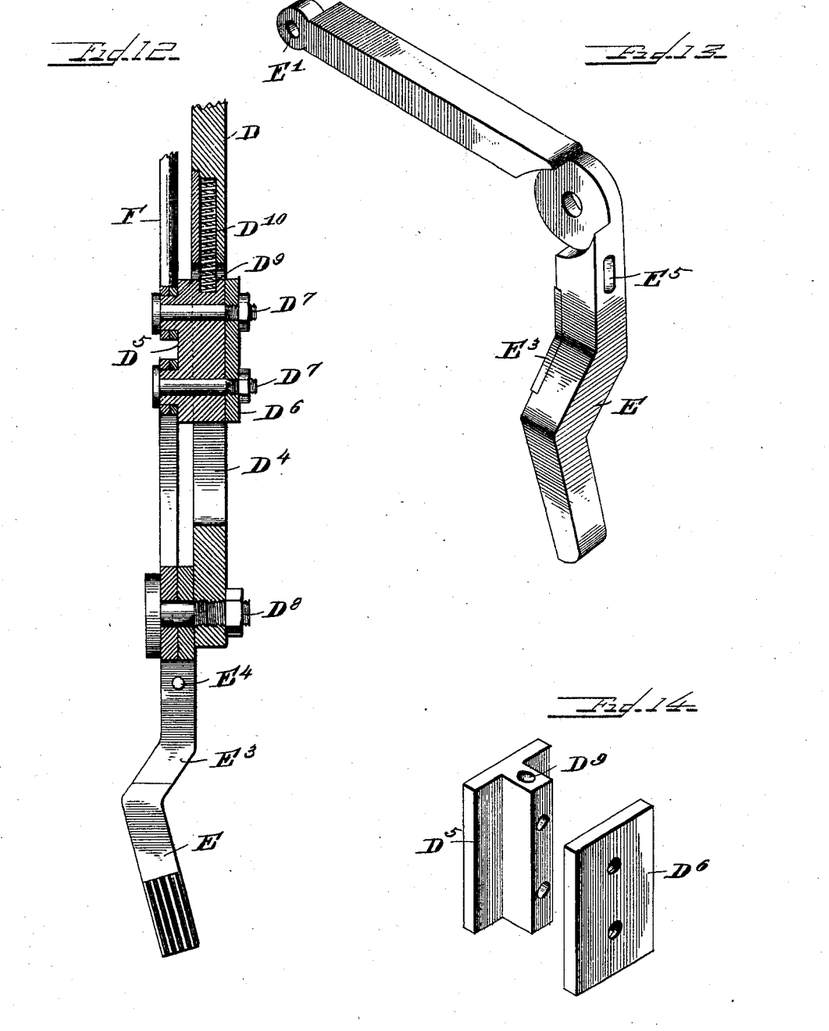
Fig. 12 is a section on line 12 12 of Fig. 10.
Fig. 13 is a perspective view of one of the jaws of the gripping-fingers.
Fig. 14 is a perspective detail of the sliding block for operating the fingers.
Figure 15:
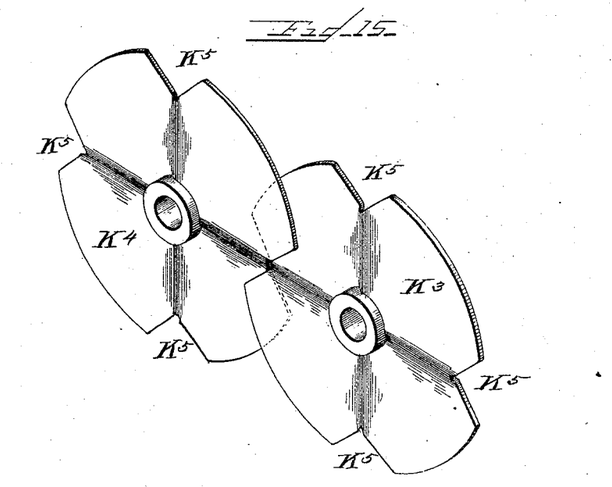
Fig. 15 is a perspective view of a pair of knives.
Figure 16:
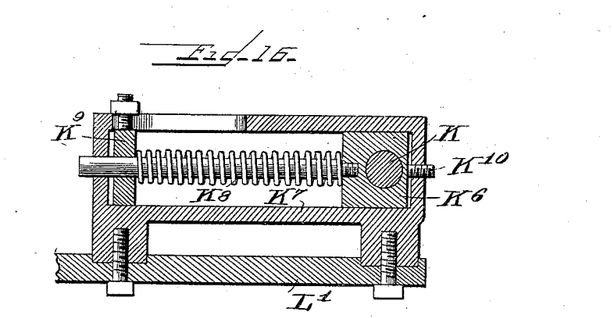
Fig. 16 is a detail of the yielding bearings of one of a pair of knives.
Figure 17:
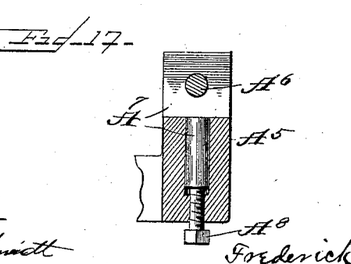
Fig. 17 is a detail showing adjustment for tension of springs for forked levers.

From the gear $B^3$ power is conveyed to an idle-gear $B^4$ and from there to a gear $H^2$ on the shaft H' to turn said shaft and its cam H. Also from the gear $B^4$ power is conveyed through the gear $B^5$ to a gear J' on the shaft J, which runs across the machine at the rear. By means of the bevel-gears $J^2$ power is conveyed from shaft J to the two shafts K, which extend through to the front of the machine, and by means of the gears $K^2$ power is conveyed from the shafts K to parallel and corresponding shafts K'. On each pair of shafts K and K' are the rotary knives or blades $K^3$ and $K^4$, which are preferably made of sheet metal and which have portions offset in opposite directions from a medial line running through them. The offset portions of a pair of knives overlap each other, and the peripheries of the knives are provided with notches $K^5$ at the points where the oppositely offset portions unite. As these knives rotate the notches of opposite knives come together and first embrace the stems of leaves placed between them and then open and release the embraced stem. In Fig. 7 the left-hand pair of knives are in a position ready to receive between them the stem of a tobacco-leaf, while the right-hand pair of knives have the stem embraced at its closest position. The stems of leaves are not all of the same size, and to accommodate variations in size the bearings $K^6$ of the shafts K are made yielding, as shown in Fig. 16. This is accomplished by placing the bearing $K^6$ in guides $K^7$ and pressing it toward the opposite knife by a spring $K^8$. An adjustable block $K^9$ serves as a means for varying the force with which the knives are pressed together, and a set-screw $K^{10}$ serves to limit the approach of the knives toward each other. To permit the knives $K^3$ to yield, their shafts K have their forward portions made in sections, as shown at $K^{11}$, the effect of which is to make the said shafts flexible at this place.

Across the front of the machine is a plate L, provided with a ledge L', which serves as a support for the bearings $K^{12}$ of the shafts K', and guides $K^7$ for the bearings $K^6$ of the shafts K. The shafts K and K' extend through this plate, and the knives $K^3$ and $K^4$ are supported closely adjacent to its front face. At points between each pair of knives the plate L bulges inward, as shown at $L^2$, and the upper portion is cut away on an incline. The inward bulge gives room for the stems of leaves as they are moved downward by the rotation of the knives $K^3$ and $K^4$, and the cutaway leaves room for the fingers E on the lever D to grasp the ends of the stems while they are embraced and moved by the knives.

Figure 1:
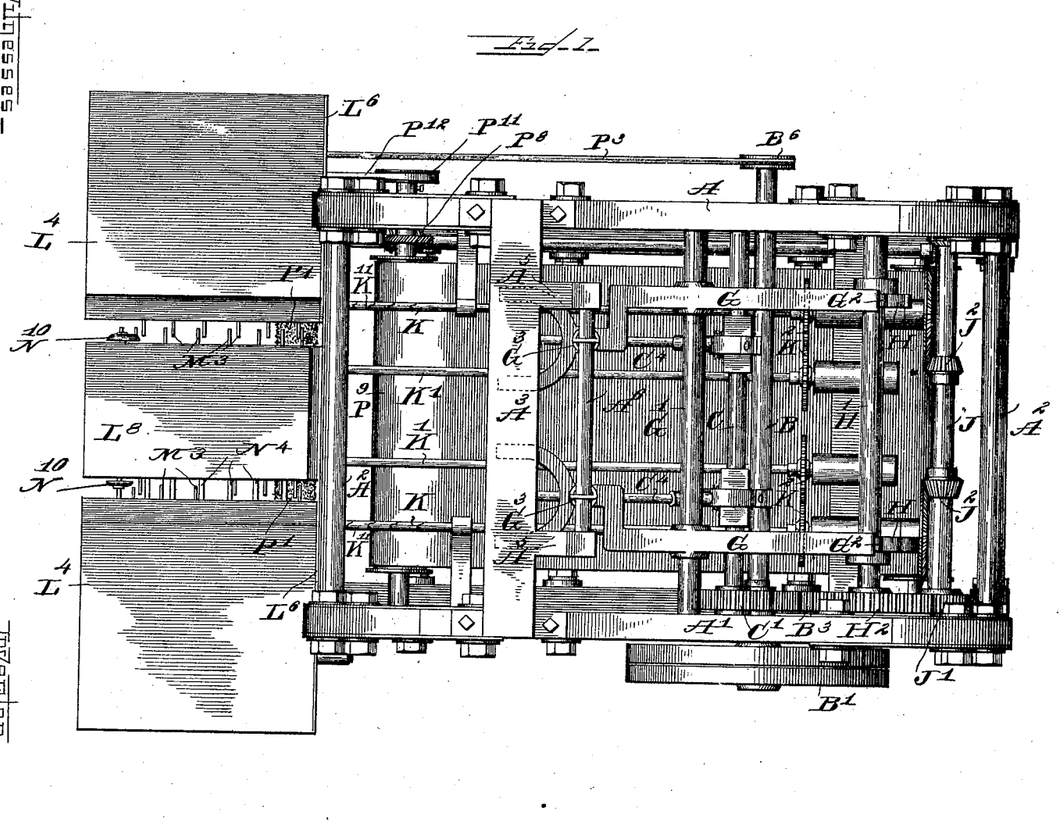
Figure 1 is a plan.
Figure 2:
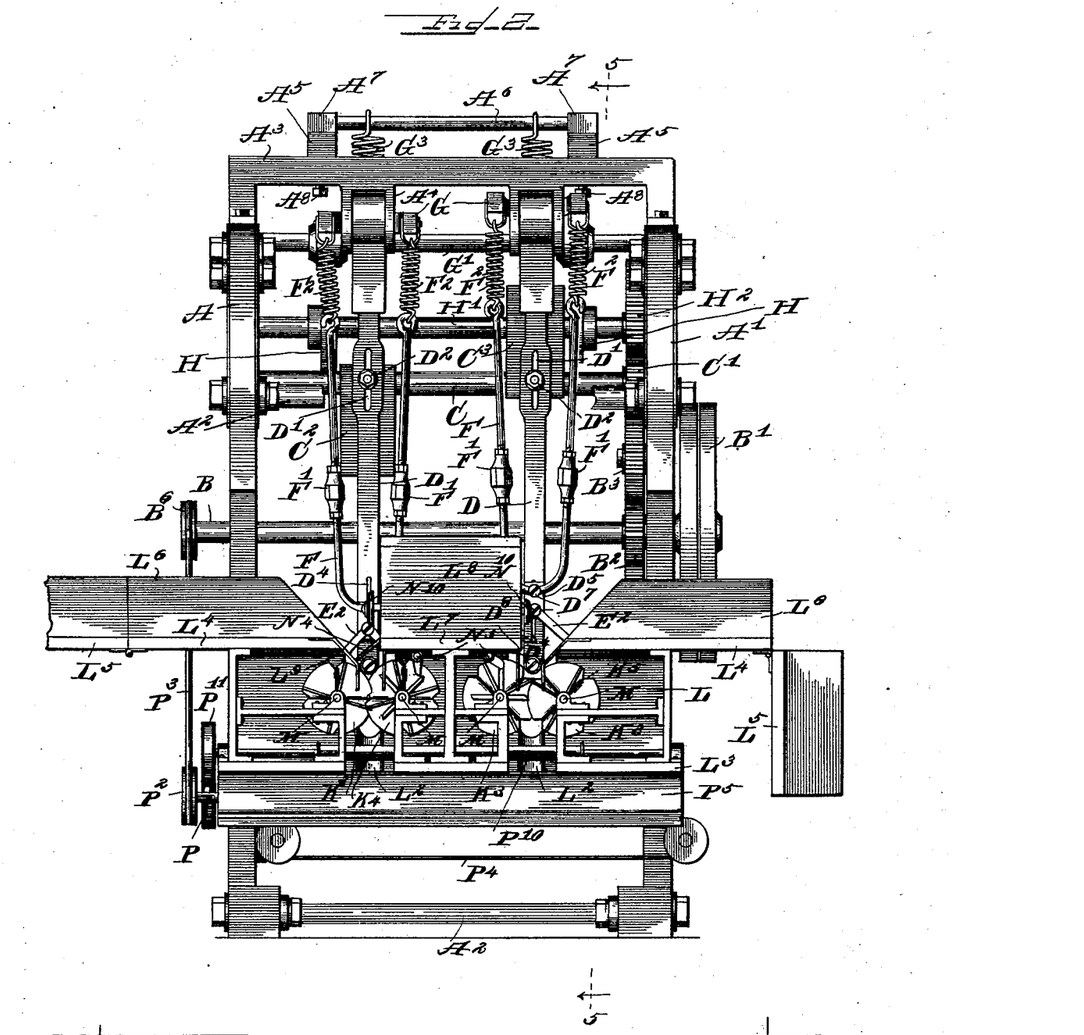
Fig. 2 is a front elevation.

Supported partly by brackets $L^3$ and partly by a ledge formed by the upper edge of the plate L are tables $L^4$, upon which are piled the leaves to be fed to the machine. In Fig. 2 these tables are shown provided with drop-leaf extensions $L^5$ for use when an extra amount of tobacco is piled on the machine. At the inner edges of the tables $L^4$ and secured to the frames are vertical boards $L^6$. The leaves are placed on the tables, with the ends of their stems against the boards $L^6$, which boards serve as guides. The tables $L^4$ and boards $L^6$ terminate just before reaching the centers, at which the stems are embraced between a pair of knives. At the center of the machine, between the two pairs of knives, is a central table $L^7$, upon which is a casing $L^8$.

Secured to the tables $L^4$ and $L^7$ are a series of fingers $L^9$. These fingers project downward to nearly the centers of the shafts K and K' and form channels or guides so located that when a tobacco-leaf is pushed by hand off of a table $L^4$ the said leaf drops into this channel and is guided thereby, so that the stem comes to the proper position to be embraced by the adjacent rotating knives $K^3$ and $K^4$.

Secured to the front ends of the shafts $K$ and $K'$ by means of couplings $M'$ are shafts $M$. These shafts $M$ are extensions of the shafts $K$ and $K'$ and are adjustable with respect thereto by the said couplings.

Supported on the central table $L^7$ are guide-standards $N$, and at suitable places on the inside of the casing $L^8$ are guides $N'$. There are two standards $N$ and two guides $N'$ at each end of the casing $L^8$. Guided to slide in an inclined direction in guides $N$ and $N'$ are pins or rods $N^2$. Assuming one side of the machine, on the front and rear rods $N^2$ is supported a bar $N^3$ to which are secured a series of fingers $N^4$ which extend downward at an incline parallel to the rods $N^2$.

Located under the table $L^7$ are the shafts $N^5$, which are supported in bearings $N^6$. On each end of the shafts $N^5$ are the bell-crank levers $N^7$, which are provided with slots $N^8$, that engage rollers $N^9$ on the ends of the bars $N^3$. Secured to the coupling $M'$ on the shaft $K'$ are four fingers $M^2$, arranged to engage the short arm of the adjacent bell-crank $N^7$. At the other end of the shaft $M$ are four other fingers $M^2$, arranged to engage the other bell-crank. As the shaft $M$ rotates the fingers $M^2$ one after another engage the levers $N^7$. The front and rear fingers $M^2$ are so adjusted that they operate simultaneously on the bell-cranks $N^7$, first raising them and then permitting them to drop back by gravity. As the bell-crank levers rise they raise the connected rod $N^3$ and their fingers $N^4$. When the bell-crank levers $N^7$ are down in their normal position, the fingers $N^4$ close the entrance to the guiding-channel formed by the fingers $L^9$, and thus prevent leaves from falling into said channel. When the bell-cranks rise under the action of the fingers $M^2$, the fingers $N^4$ are drawn back and upward, so as to open the entrance to the said channel and permit a leaf to fall with its stem in position to be embraced by the knives $K^3$ and $K^4$. Also on each shaft $M$ are four rows of fingers $M^3$, arranged so that they project between the fingers $L^9$ into the leaf-guiding channel or chute and beyond the ends of the corresponding fingers $M^3$ of the adjacent shaft $M$. Secured on the side of the casing $L^8$ is a bell $N^{10}$, and adjacent to it is a clapper $N^{11}$, arranged to be struck by one of the bell-cranks $N^7$ or by the rod $N^3$, so as to sound the said bell and notify the operator when the adjacent guiding-channel is closed by the fingers $N^4$. On the opposite side of the casing $L^8$ is another bell $N^{10}$ of a different tone, arranged to be similarly sounded, so as to notify the operator on that side of the machine that his guiding-channel has been closed by the dropping of the fingers $N^4$ across the entrance to that channel.

The relationship of the several parts just described is best illustrated in Fig. 7. When an operator hears his bell ring, the devices on his side of the machine are in a position shown at the right in Fig. 7. At that instant he pushes a leaf, which has its stem against and is guided by the board $L^6$ into the opening between the tables $L^4$ and $L^7$. It then rests partly upon the plate which forms the upper portion of the right-hand fingers $L^9$ and partly upon the rods $N^2$ and the fingers $N^4$, that lie between the rods $N^2$. As the upper portions of the knives $K^3$ and $K^4$ rotate toward each other the finger $M^2$ engages the short arm on the bell-crank $N^7$ and raises the rods $N^2$ and fingers $N^4$ to permit the leaf to fall into the guiding-channel between the fingers $L^9$. By the time the entrance to the guiding-channel is open enough to permit the leaf to drop the fingers $M^3$ have passed between the fingers $L^9$ into the guiding-channel and serve as a support to prevent the leaf from falling too far. In the meantime the notches $K^5$ have moved toward each other and are in a position to receive the stem of the leaf as it falls. The relative positions of these parts is then that shown at the left hand of Fig. 7. By a still further movement of the shafts $M$ the notches $K^5$ close in on the stem of the leaf, and the fingers $M^3$ gradually lower the leaf through the guiding-channel or chute. As the knives continue to rotate the notches close closer and closer upon the stem of the leaf until they assume the position shown at the point midway between the shafts $M$ at the right hand of Fig. 7, after which the notches begin to separate, and finally permit the leaf to drop downward. At the time when the notches $K^5$ first close over the stem of a leaf, which would be at a position about midway between those shown at the right and left in Fig. 7, the fingers $E$ have moved forward closely adjacent to the rear faces of the knives and seize the stem as it protrudes through between the said knives. As the notches gradually close upon the stem the stem is being rapidly drawn through the diminishing aperture made by said notches. The diminution of the size of the aperture between the knives corresponds closely to the diminution of the size of the stem being drawn through it. This is true up to the time the notches pass the center, after which the aperture increases in size. In stripping tobacco-leaves in this way the stripped portion piles up against the blades of the knives, and to prevent the breaking of the stem by such piling up it is necessary to slacken the grip around the stem. This is what happens when the notches $K^5$ pass the center. The exact point at which this slackening of the grip around the stem by the knives should occur differs somewhat in leaves of different sizes and is a matter of experiment. To permit the knives to be adjusted circumferentially with respect to the forward and backward movement of the associated gripping-fingers $E$, the said knives are secured to their respective shafts by means of the nuts $K^{13}$, as shown in Fig. 8. If it is desirable that the closure around the stem slacken sooner, the knives are advanced on their shafts, while if it is desirable that it occur later they are moved backward, in either case being secured in place by the nuts $K^{13}$. By means of the adjustable character of the connection $M'$ between the knife-shafts K and $K'$ and the shafts M, as shown in Fig. 8, the fingers $M^2$ are circumferentially adjustable with respect to the knives $K^3$ and $K^4$. This permits a control of the exact time at which the entrance of the leaf-guiding channel shall be opened. The adjustable character of the coupling $M'$ also permits the supporting-fingers $M^3$ to be adjusted circumferentially with respect to the notches $K^5$. As the stripped leaf drops from the knives it falls upon a revolving brush $P'$ on the shaft P and is thrown forward onto a conveyer $P^4$. There is a brush $P'$ for each pair of knives $K^3$ and $K^4$, and the said brushes are driven by a belt $P^3$ from a pulley $B^6$ on shaft B to a pulley $P^2$ on shaft P. The speed of the brushes $P'$ is comparatively rapid, and to prevent the stripped leaf being thrown too far there is provided a guard $P^5$, adjacent to the front edge of the conveyer $P^4$. This conveyer is driven by a shaft $P^6$, which extends to the rear of the machine, and which is in turn driven by the shaft J through the intervention of bevel-gears and a short vertical shaft $P^7$. The action of the brushes $P'$ in striking and throwing the leaves as they drop from the stripping-knives is to open them up or loosen them from the bunched condition in which they leave said knives.

Figure 4:
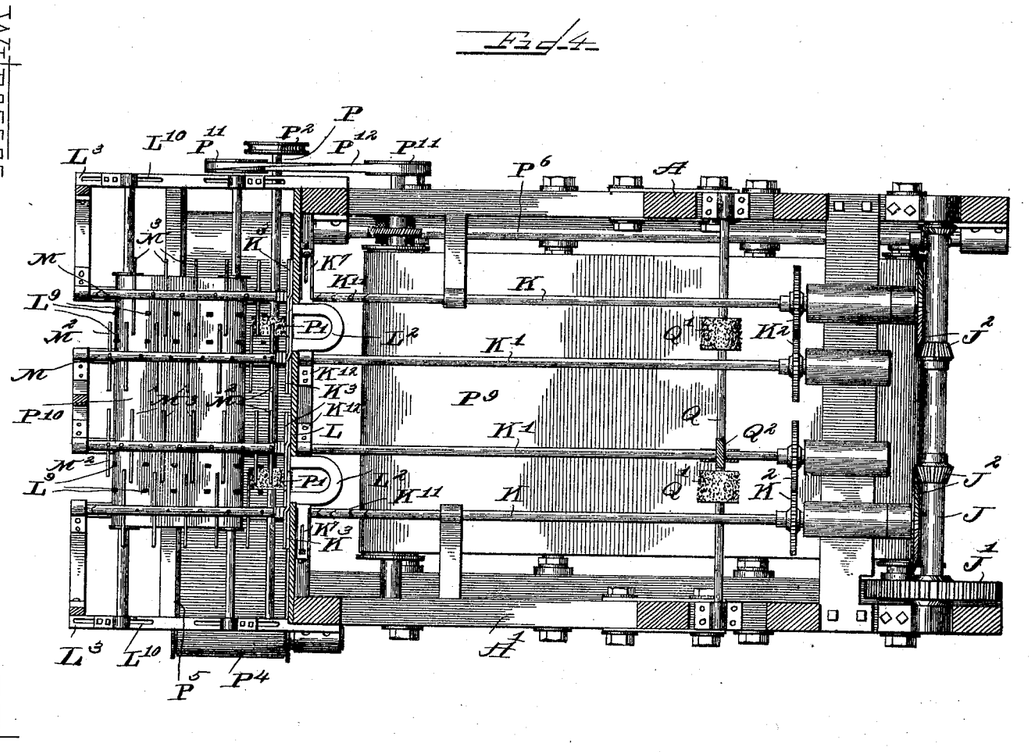
Fig. 4 is a section on line 4 4 of Fig. 3, showing the lower part of the machine in plan.
Figure 5:
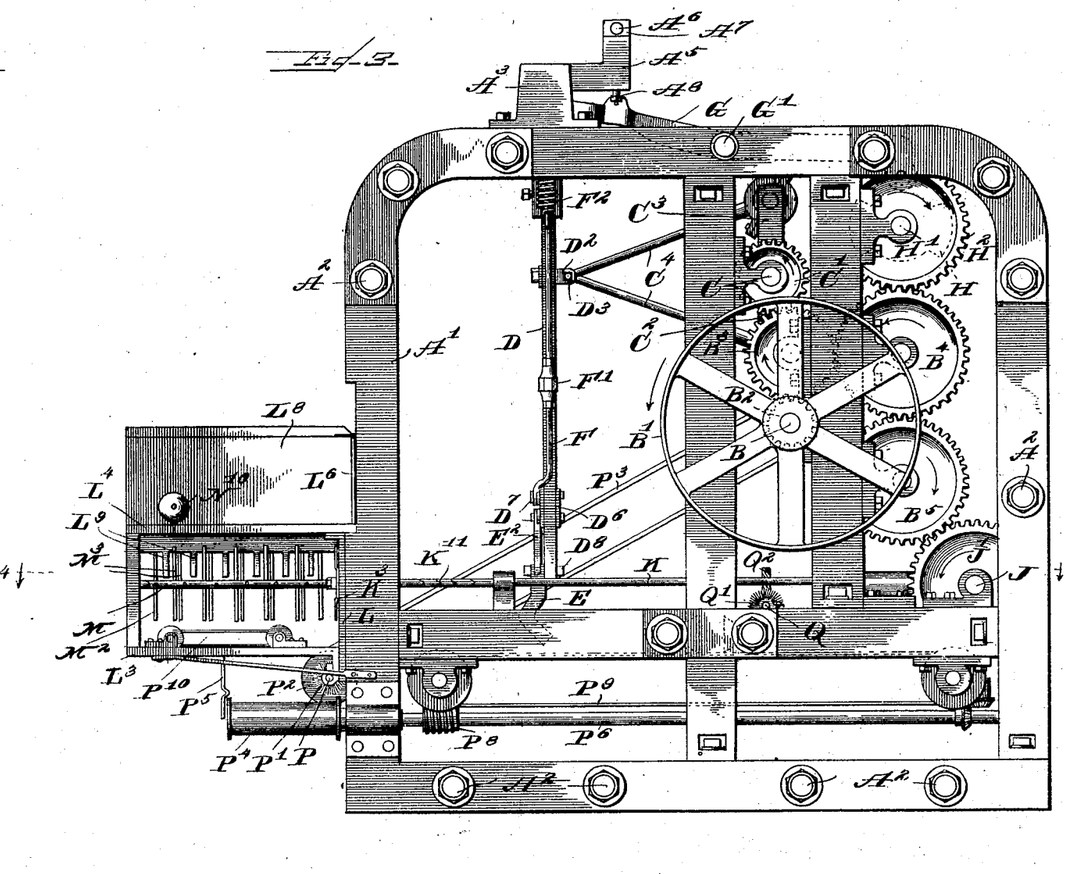
Fig. 5 is a sectional elevation taken on line 5 5 of Fig. 2.
Figure 6:
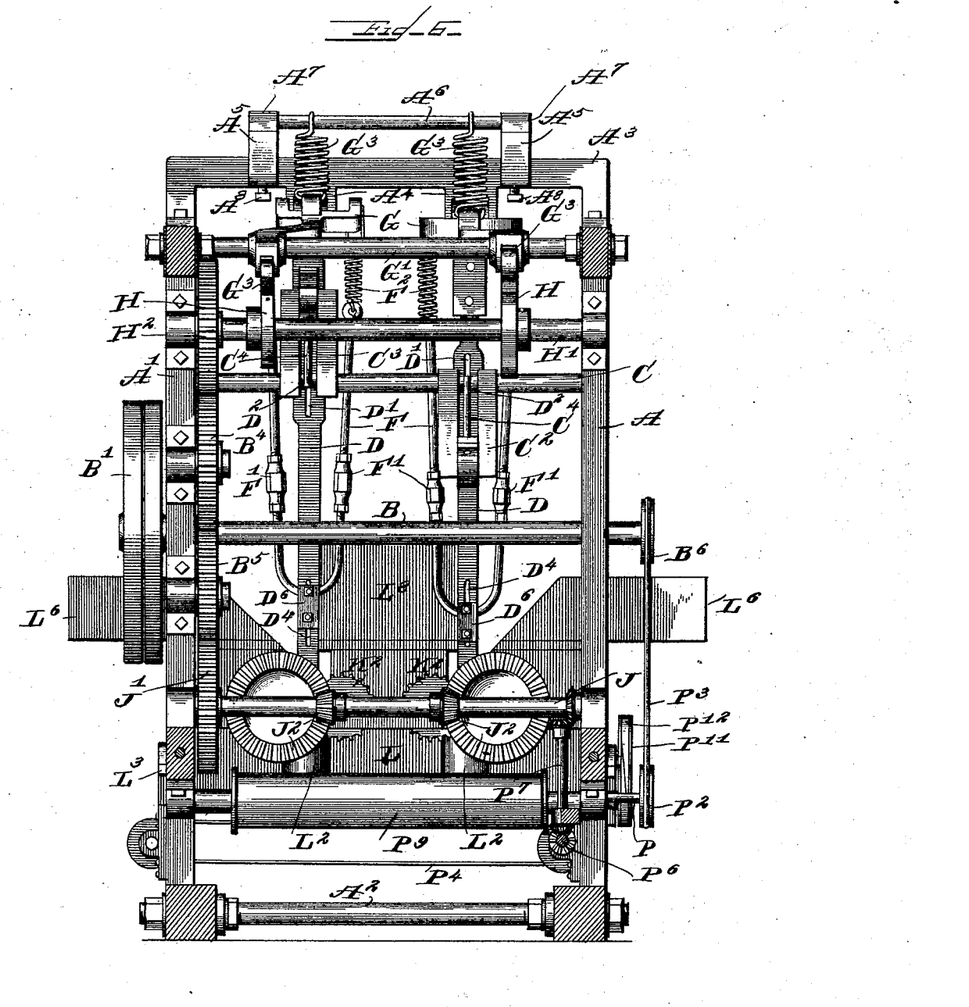
Fig. 6 is a rear elevation, the frame being shown in section on line 6 6 of Fig. 5.

Running across the rear part of the machine is a shaft Q, (see Fig. 4,) on which are brushes $Q'$, arranged to engage and clean the gripping-fingers E at their extreme rear position after they have released the stem they have drawn through the stripping-knives. The shaft Q is driven from one of the shafts $K'$ by means of a pair of spiral gears $Q^2$.

A worm-gear $P^8$ on the shaft $P^6$ serves to convey power to a conveyer $P^9$, which carries the stripped stems to the rear of the machine after they have been dropped by the gripping-fingers E. Supported on the bracket $L^3$, under the leaf-guiding channels, is another small conveyer $P^{10}$, that carries toward the front anything that drops upon it. The object of this conveyer is to keep off of the conveyer $P^4$ any leaves, pieces of leaves, or odd articles of any kind that may fall into the leaf-guiding channels other than that which is stripped from stems drawn through the knives. To accomplish this to the best advantage, there is left between the inner end of the conveyer $P^{10}$ and the front plate L only enough room for the stripped part of the leaf to fall down upon the brush $P'$. The remaining part of the space under the leaf-guiding channels is covered by the conveyer $P^{10}$. Large leaves when stripped form large bunches against the face of the knives and require considerable space to fall through, while small leaves are short, form only small bunches, and require only a small space. To accommodate the conveyer $P^{10}$ to these differences and keep the opening through which the stripped leaves fall as small as possible, the brackets $L^3$ are provided with slots $L^{10}$, (see Fig. 4,) by means of which the bearings for the shafts of the conveyer $P^{10}$ may be moved toward or from the faces of the stripping-knives. The said conveyer therefore acts in the capacity of a separator to keep unstripped leaves and foreign articles out of the stripped leaves which are deposited at one side of the machine by the conveyer $P^4$. If a leaf placed with its stem between the knives $K^3$ and $K^4$ should for any reason not have its stem drawn through the said knives, such leaf will drop with the greater portion of its length on the conveyer $P^{10}$ and will be discharged at the front of the machine and not on the conveyer $P^4$ with the stripped leaves. The conveyer $P^{10}$ is driven from the conveyer $P^9$ by means of the pulleys $P^{11}$ and belt $P^{12}$.

What I claim is—

1. In a tobacco-stripping machine, a pair of stripping blades or knives, means for opening and closing said blades, and automatically-operating means for permitting a leaf to drop with its stem between said blades at a predetermined time prior to the closing of said blades.

2. A pair of leaf-stripping knives, a chute serving as a means for guiding the stem of leaves to a position between said knives, and a device for opening and closing said chute.

3. A pair of leaf-stripping knives, means for opening said knives so as to close them upon the stems of leaves placed between them, a chute serving as a guide for the proper placing of such leaves, and means for opening and closing said chute.

4. A pair of stripping-knives arranged to close upon the stems of leaves, a guide for the proper placing of such leaves with respect to said knives, and means for supporting said leaves within said guide.

5. A pair of stripping-knives arranged to close upon the stems of leaves, a guide for the proper placing of such leaves with respect to said knives, and supporting devices located within said guides and arranged to gradually lower the leaves through said guides.

6. A pair of stripping-knives arranged to close upon the stems of leaves, a guide for the proper placing of such leaves with respect to said knives, a device for supporting the leaves within said guide, and automatically-operating means for controlling the entry of leaves into said guide.

7. A pair of revolving knives arranged to interlock with each other and to close upon the stems of leaves substantially as described, guides for the proper placing of leaves with respect to said knives, and devices moving with said knives and arranged to support leaves while within said guides.

8. In a tobacco-stripping machine, a pair of revolving and interlocking knives arranged to close upon the stems of leaves, and automatically-operating means for controlling the placing of leaves with their stems between said knives.

9. In a tobacco-stripping machine, a pair of knives arranged to open and close, a table serving to support tobacco-leaves and provided with an opening leading to a guide for the proper placing of leaves with respect to said knives, and automatically-operating means for opening and closing the entrance to said guide.

10. In a tobacco-stripping machine, leaf-stripping knives arranged to open and close, a guide for the proper placing of the leaves with respect to said knives, a table provided with an opening leading to said guide, and automatically-operating means for causing a leaf to move slowly through said guide.

11. In a tobacco-stripping machine, leaf-stripping knives arranged to open and close, a guide for the proper placing of leaves with respect to said knives, a table provided with an opening leading to said guide, means for opening and closing the entrance to said guide, and means for lowering a leaf through said guide.

12. The combination with a leaf-stripping machine, of a guide for the proper presentation of a leaf to said machine a table provided with a passage-way leading to said guide, and devices for opening and closing said passage-way.

13. The combination with a leaf-stripping machine, of a guide for the proper presentation of a leaf to said machine, a table provided with a passage-way leading to said guide, and an indicating device for notifying the operator of a proper time for him to place a leaf in said passage-way.

14. The combination with a leaf-stripping machine, of a guide for the proper presentation of a leaf to said machine, a leaf-supporting device arranged to close the entrance to said guide, and automatically-operating means for removing said supporting device so as to permit a leaf to pass to said guide at the proper instant of time.

15. The combination with a leaf-stripping machine, of a guide for controlling the presentation of leaves to said machine, a leaf-supporting device arranged to close the entrance to said guide, automatically-operating means for removing said supporting device so as to permit a leaf to pass to said guide at the proper instant of time and to close the entrance to said guide immediately after the passage of a leaf therethrough, and a bell for indicating the closure of the entrance to said guide.

16. A pair of rotating shafts, leaf-stripping knives secured to and moved by said shafts, and leaf-conveying devices arranged to move a leaf presented to said knives at a speed corresponding to the movement of said knives.

17. A pair of rotating shafts, leaf-stripping knives moved by said shafts and a series of leaf-supporting fingers secured to and moved by said shafts.

18. A pair of rotating shafts, leaf-stripping knives secured to said shafts, a series of leaf-supporting fingers also secured to said shafts, and a guide serving for the proper placing of the leaves with respect to said knives and said fingers.

19. A pair of rotating shafts, leaf-stripping knives secured to said shafts and provided with notches arranged to interlock substantially as described, leaf-supporting fingers secured to said shafts and arranged to support leaves in proper position with respect to the notches in said knives, a guide for securing the proper placing of leaves with respect to said knives and said fingers, and means for controlling the admission of leaves to said guide.

20. The combination with a leaf-stripping device consisting of knives arranged to embrace the stems of leaves, and a gripping device arranged to draw the stems of leaves through the stripping device, of automatically-operating means for presenting leaves to said stripping and gripping devices.

21. The combination with leaf-stripping knives arranged to embrace the stems of leaves, of a guide for securing the proper placing of the stems of leaves between said knives, and means for controlling the admission of leaves to said guide.

22. The combination with a pair of disks provided with registering series of notches in their edges, and means for rotating said disks so as to cause said notches to engage the stems of leaves, of automatically-operating devices for presenting the stems of leaves to notches in said disks.

23. The combination with a pair of disks provided with a registering series of notches in their edges, and means for rotating said disks so as to cause said notches to engage the stems of leaves, of a guiding device for directing the proper presentation of the stems of leaves to said disks, and means for controlling the passage of leaves through said guide whereby the stems of said leaves are presented to said disks at the time corresponding notches of opposite disks are approaching each other.

24. The combination with a pair of disks provided with a registering series of notches in their edges, and means for rotating said disks so as to cause said notches to engage the stems of leaves, of a guide for securing the proper presentation of the stems of leaves to the notches in said disks, means for controlling the admission of leaves to said guides, and a moving support for the leaves arranged to move them at a speed corresponding to the speed of the notches in said disks.

25. The combination with a pair of leaf-stripping knives, and automatically-operating means for placing the stems of leaves between said knives, of devices for gripping the stems of leaves placed between said knives, and means for moving said gripping devices to and from said knives.

26. The combination with leaf-stripping devices, and automatically-operating means for placing the stems of leaves in said stripping devices, of stem-gripping devices, means for moving the stem-gripping devices to and from the stripping devices, and means for adjusting the length of such movement.

27. The combination with a leaf-stripping device, of grippers adapted to seize the stem of a leaf placed in said device, means for closing said device, a spring for controlling the pressure of the grippers upon the stem, and a second spring arranged to open said grippers when the tension on the first-mentioned spring is relieved.

28. In the stem-gripping devices of a tobacco-stripping machine, a pair of gripping-fingers, a cam and connections for closing said gripping-fingers, a spring in said connections for controlling the pressure exerted by said gripping-fingers, and a second spring arranged to open said gripping-fingers when the tension on the first-mentioned spring is relieved.

29. In the stem-gripping devices of a tobacco-stripping machine, a pair of gripping-fingers, a cam and connections for closing said gripping-fingers, a spring in said connections for controlling the pressure exerted by said gripping-fingers, means for varying the tension of said spring, and a second spring arranged to open said gripping-fingers when the tension on the first-mentioned spring is relieved.

30. The combination with leaf-stripping devices, stem-gripping devices, and means for moving the gripping devices to and from the stripping devices, of a cleaning-brush located in the path of said gripping devices.

31. In a tobacco-stripping machine, the combination with stem-gripping devices and means for moving them, of a revolving brush adapted to engage and clean said gripping devices.

32. In a tobacco-stripping machine, the combination with a leaf-stripping device, of a stem-gripping device, means for moving said gripping device to and from the stripping device, means for operating said gripping device so as to close it at one extreme of its movement and open it at the other extreme, and a cleaning device arranged to engage said gripping device when opened.

33. In a tobacco-stripping machine, the combination with leaf-stripping devices, guides for the proper placing of leaves in said stripping devices, and a conveyer located beneath said guides, said conveyer being arranged to remove leaves not engaged by said stripping devices.

34. In a tobacco-stripping machine, a leaf-guiding channel, devices arranged to engage and strip leaves passing through said channel, a conveyer arranged to remove leaves stripped by said stripping devices, and a second conveyer arranged to remove leaves which pass through said channel but which are not engaged by said stripping devices.

35. In a tobacco-stripping machine, mechanism for stripping leaves from their stems, devices for separating stripped from unstripped leaves, and means for adjusting said devices for leaves of different sizes.

36. In a tobacco-stripping machine, a pair of leaf-stripping blades between which the stems of leaves are drawn and from which the stripped leaves drop, and a rotating brush against which the stripped leaves drop and by which the leaves are loosened after being stripped, substantially as described.

37. In a tobacco-stripping machine, knives arranged to close upon the stems of leaves, a guide for directing the stems of leaves to said knives, means for opening and closing the entrance to said guide, and means for adjusting the opening action of the guide and the closing action of the knives with respect to each other.

38. In a tobacco-stripping machine, a pair of rotating knives for stripping leaves, leaf-supporting fingers moving with said knives, and means for adjusting said knives and said fingers with respect to each other.

39. In a tobacco-stripping machine, a pair of leaf-stripping knives, a leaf-supporting table provided with an aperture a board $L^6$ serving as a guide for the longitudinal placing of leaves with respect to said knives, and a leaf-guiding channel for the proper lateral placing of leaves.

40. In a tobacco-stripping machine, the combination with leaf-stripping devices arranged to close around the stem of a leaf being drawn through the stripping devices and to gradually relieve the tightness of such closure, of means for adjusting said stripping devices so as to cause such relief to occur at any desired point in the length of the stem being drawn therethrough.

41. In a tobacco-stripping machine, the combination with devices furnishing an aperture by means of which the stem of a leaf drawn through said aperture is stripped, of means for varying the size of the aperture through which the stem is drawn, and means for adjusting said variations so as to have them occur at desired points in the length of the stem drawn through said aperture.

Signed at Chicago, Illinois, this 7th day of May, 1902.

FREDERICK G. FRANKENBERG.

Witnesses:
WM. A. ROWLAND,
CASPER L. REDFIELD.